UNITED STATES PATENT OFFICE.

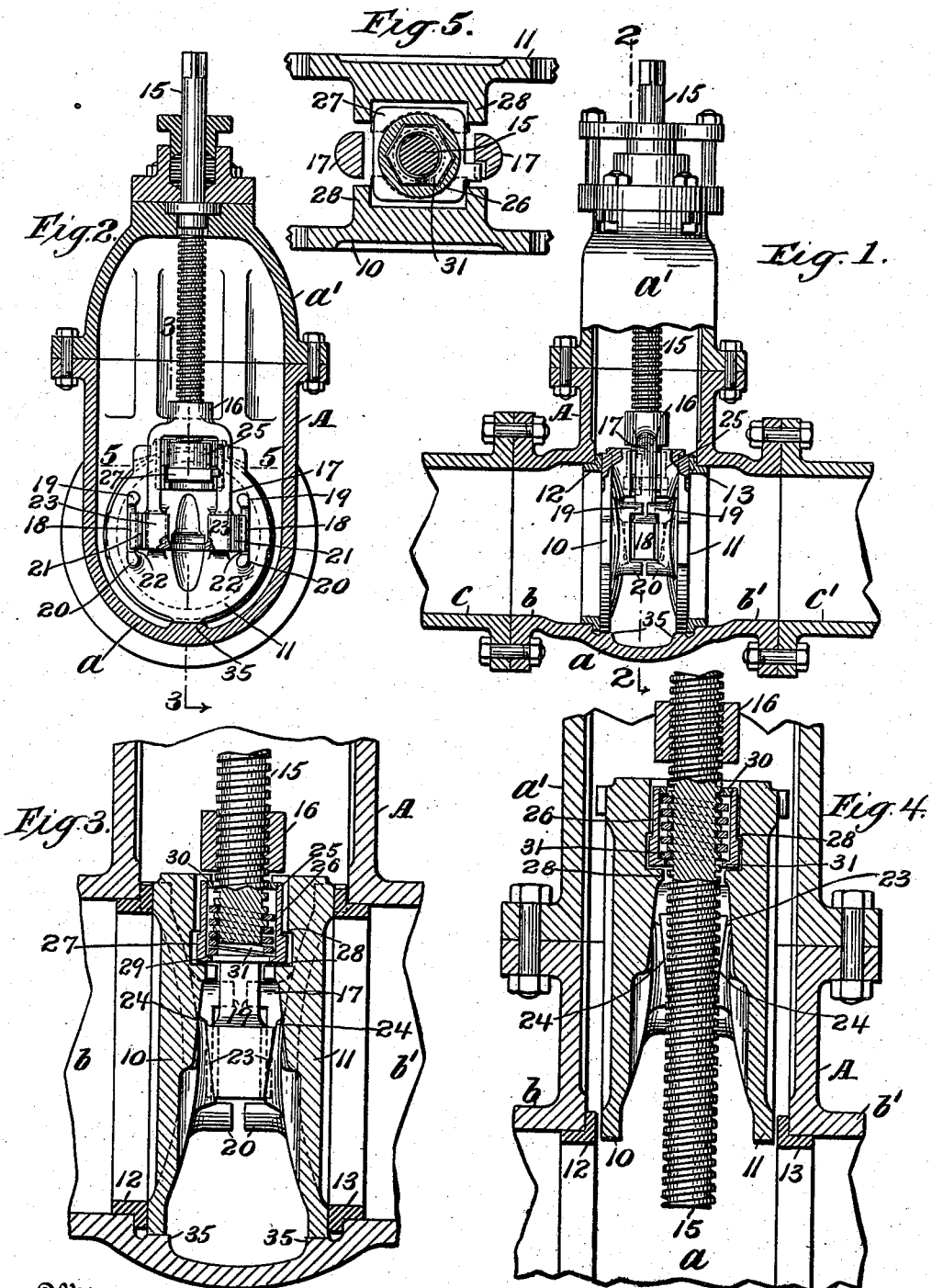

ANTHONY P. SMITH, OF NEWARK, NEW JERSEY.

GATE-VALVE.

No. 868,025.	Specification of Letters Patent.	Patented Oct. 15, 1907.

Application filed April 18, 1906. Serial No. 312,309.

*To all whom it may concern:*

Be it known that I, ANTHONY P. SMITH, a citizen of the United States, residing at Newark, county of Essex, and State of New Jersey, have invented certain new and useful Improvements in Gate-Valves, fully described and represented in the following specification and the accompanying drawings, forming a part of the same.

This invention relates to means for operatively connecting and disconnecting parts or devices relatively movable through the operation of co-acting screw threads, and to gate valves having such connecting and disconnecting means.

The invention has been made especially with the idea of producing an improved valve of that class in which the valve disk or valve proper is given its closing and opening movement across or parallel with the plane of its seat. In such valves it is desirable in order to prevent excessive wear of the parts that the valve shall not be in contact with its seat while making its opening and closing movements, and such valves have heretofore been provided with means for forcing the valve disk against its seat after it has been moved edgewise, or in the direction across the seat, into closing position, and for permitting the valve disk to move away from its seat before it is given its opening movement. Such movement of the valve disk flatwise toward and from its seat is preferably secured by a relative movement between the valve disk and a part which moves with the valve in its opening and closing movements, preferably through the wedging or cam action of oppositely inclined surfaces on the valve disk and such actuating part. In order to provide for such relative movement between the valve disk and the actuating member and the resulting flatwise movement of the valve disk when the valve disk is in its closing position and for preventing such relative movement and resulting flatwise movement of the valve disk during the edgewise opening and closing movements of the valve disk, connecting means are provided between the valve disk and the actuating member adapted to lock the valve disk and the actuating member against such relative movement during the opening and closing movements of the valve disk and to permit such relative movement when the valve is in its closing position opposite its seat. In United States Letters Patent No. 684,118, granted to me October 8, 1901, there is described and claimed a valve construction comprising connecting means for securing this result. In the construction of such patent, which shows a valve having two valve disks arranged back to back, the valve disks and an actuating yoke are reciprocated in the direction edgewise of the valve disks by a screw stem by the turning of which stem the valve disks may be moved edgewise out of or into closing position. The means for locking the valve disks to move with the yoke includes a screw nut connected with the valve disks so as to be held against movement relatively thereto in the direction of their edgewise opening and closing movements and adapted to receive the actuating screw stem so as to lock the valve disks relatively to the yoke during the edgewise opening and closing movements. This nut is so located and the screw stem is of such length, that when the valve disks have been moved into closing position the nut will have run off from the end of and out of engagement with the thread of the screw stem, thus unlocking the valve disks from the yoke and permitting the yoke to be given further inward movement by the continued rotation of the screw stem while the valve disks remain stationary, for the purpose of forcing the valve disks flatwise against the valve seats by means of co-acting inclined or wedge faces formed on the yoke and the valve disks respectively. With this construction, in which the locking nut becomes disconnected from the screw stem at each closing operation and becomes connected therewith again at the commencement of each opening movement of the valve disks, difficulty has been experienced in securing an easy and sure engagement of the thread of the screw stem with the thread of the nut in the start of the opening operation, and in the wear and bending of the end portions of the thread of both the nut and the screw stem due to the excessive strain thereon at the beginning of the opening and at the end of the closing movements.

The present invention has been made particularly with the idea of overcoming the difficulties above referred to met with in the use of the locking nut shown in my said Patent No. 684,118, but it will be understood that the invention is not to be limited to constructions of this class but includes locking and releasing means as claimed, capable of general application; and the object of the invention considered broadly is to provide means whereby relative movement between two members resulting from the rotation of one of two screw threaded parts by which said members are connected will be automatically interrupted at a certain point while the rotation of the rotary screw threaded part continues without necessitating the disengagement of the screw threaded parts; and more especially the invention aims to provide for a relative movement between two members which are normally moved together by means of a screw threaded member engaging screw threads on the two movable members.

To these ends the invention consists in providing one of two members having coöperating screw threads by means of which rotation of one of such members causes a relative reciprocatory movement between the members axially of the screw threads with a collapsible screw thread, whereby when the members are in a certain relative position rotation of the rotary member may be continued without causing further relative movement between the members axially of the screw threads.

A full understanding of the invention can best be given by a detailed description of a construction embodying the invention in a preferred form, and such a description will now be given in connection with the accompanying drawings showing a gate valve of the general form shown in my patent above referred to, in which drawings:—

Figure 1 is a view of the gate valve partly in section. Fig. 2 is a section on line 2 of Fig. 1. Fig. 3 is an enlarged sectional view on line 3 of Fig. 2, the upper portion or bonnet of the valve casing being broken away. Fig. 4 is a similar sectional view of the operating parts showing the same in open position. Fig. 5 is an enlarged detail sectional view taken on line 5 of Fig. 2.

Referring to the drawings, A represents a valve casing comprising a body portion a having ends b b' for connecting with pipes c c' and having a bonnet portion a' into which the valve disks are withdrawn in making their opening movement. The valve disks 10, 11 are arranged back to back and are adapted to close against valve seats 12 and 13 oppositely mounted in the body of the casing intermediate of its ends b b'. The valves are given their edgewise opening and closing movements, that is, their movements across the valve seats, by means of a rotary operating rod 15 which extends through the upper end of the bonnet of the valve casing and is held against longitudinal movement therein, and the portion of which rod that extends inside the valve casing is screw threaded and screws through a threaded portion or nut 16 of an operating yoke 17 which extends between the valve disks. The yoke 17 is provided with oppositely projecting extensions 18, each adapted to engage a pair of lugs 19, 20 on each of the valve disks, and is also provided on each side of each of the extensions 18 with guiding shoulders or ribs 21 for engaging guiding shoulders or ribs 22 on the valve disks to hold the valve disks against any turning movement. The distance between the lugs 19, 20 of each pair is such relatively to the width of the extensions 18 of the yoke as to permit a limited relative movement between the yoke and the valve disks, and the yoke is provided on each side with a pair of inclined faces 23 for co-acting with correspondingly inclined faces 24 on the valve disks, such inclined faces extending in the direction of the opening and closing movements of the valve disks and being inclined so that an inward movement of the operating yoke relatively to the valve disks will cause the valve disks to move flatwise away from each other and toward the seats, and relative movement in the opposite direction will release the valve disks and permit them to move flatwise toward each other and away from the seats.

As so far described, the construction shown is substantially the same as that shown in my said Patent No. 684,118. As in said patent also, the construction shown in the drawings of this application is provided with a nut located between the valve disks and held against movement relatively to the valve disks in the direction of their opening and closing movements and adapted to receive the screw threaded end of the operating rod for the purpose of causing the valve disks to move with the operating yoke during the edgewise opening and closing movements of the valve disks. Instead of the form of nut shown in said patent, however, having an integral or unyielding thread, there is provided in accordance with the present invention and as shown in the drawings a nut 25 having a collapsible thread. The nut has a tubular shell or casing 26 having a flange 27 adapted to extend between shoulders 28 on the valve disks for preventing relative movement between the nut and the valve disks in the direction of the opening and closing movement of the valve disks; and fitted within the shell 26 between end retaining shoulders or flanges 29 and 30, and held against turning therein, is a collapsible helix 31 of proper form and size to form when expanded a screw thread of proper size to receive and co-act with the threaded portion of the operating stem 15, and of such a length that when expanded to the pitch of the operating screw it will entirely fill the space between the retaining shoulders 29 and 30. The nut will thus be prevented when the operating screw extends all the way through the collapsible thread from moving longitudinally of the operating screw except as it is given such movement by the turning of the screw, and the locking nut, and consequently the valve disks, will thus be locked against movement relatively to the operating yoke so long as the operating screw extends all the way into or through the collapsible thread of the locking nut. When, however, the operating screw extends only part way into the collapsible screw thread of the locking nut, the portion of such screw thread which is not engaged by and held distended by the threads of the operating screw, may be forced together or collapsed, thus permitting a movement of the operating yoke relatively to the locking nut and valve disks.

The operating screw is of such a length that when the valve disks are in their closing position, as shown in Fig. 3, the operating screw will extend only part way through the collapsible thread of the locking nut. The retaining shoulder 30 is preferably removable, as by being formed of a screw ring as shown, so as to permit of the removing of the helix from the shell 26. The helix may be prevented from turning in the shell in any suitable manner, as by being of hexagonal form externally, as shown, or of other irregular form, to fit the correspondingly formed interior of the shell; and the exterior form of the helix is preferably such that it can be placed in the shell only in one position, thus insuring the proper relation between the collapsible thread of the nut 25 and the thread of the yoke. As shown one of the hexagonal sides of the helix is for this purpose made wider than the others.

The operation is as follows:—During the opening and closing movements of the valve disks, the operating screw will extend through the collapsible thread of the locking nut, as shown in Fig. 4, and the valve disks will thus be locked against movement relatively to the operating yoke. In closing the valve, the disks will move with the yoke until they are brought into closing position, whereupon further edgewise movement will be prevented by engagement of the disks with stop lugs 35 in the bottom of the valve casing. At this time the locking nut will have run partly off from the operating screw, thus effecting the unlocking or disconnecting of the operating yoke from the disks and permitting the yoke to be moved farther downward relatively to the valve disks by continued rotation of the operating screw, such continued rotation of the operating screw being possible without corresponding movement of the nut 26 and valve disks by reason of the collapsing or forcing together of the lower turns of the helix 31. By such continued downward movement of the operating yoke while the valve disks are held against further movement, the valve disks will be forced apart and against the valve seats by means of the coöperating cam faces 23 and 24. In opening the valve, the operating yoke will first be moved outward by the turning of the operating screw to release the valve disks from the pressure which forces them flatwise against the seats. Such movement of the operating yoke relatively to the valve disks will continue until the extensions 18 of the yoke engage the lugs 19 on the valve disks, or until the upper end of the collapsible thread has been drawn upward into engagement with the retaining collar 30 of the locking nut, whereupon the valve disks will be moved outward with the operating yoke and will be locked against movement relatively to the yoke when the operating screw extends through the collapsible thread of the locking nut and will thereafter remain so locked during the opening and closing movements of the valves and until on the next closing movement the thread of the locking nut has been advanced partly beyond the end of the operating screw.

Instead of forming the nut 26 with a collapsible interior thread, the nut might be formed with a solid thread and a collapsible thread mounted on the end portion of the operating screw. The invention might also obviously be applied to constructions in which an interiorly threaded cylinder was arranged to coöperate with an exteriorly threaded nut or other member, one of such parts being provided with a collapsible thread in accordance with the invention.

What is claimed is:

1. The combination with a valve seat and a gate valve movable edgewise across the seat to open and closing positions and also flatwise toward and from the seat, of a reciprocating member, means for forcing the valve against the seat when in closing position by the movement of said reciprocating member relatively to the valve, a screw threaded operating rod, a screw nut on said rod connected with the valve for causing the valve to be reciprocated by the turning of the operating rod, and a screw nut on said rod connected with said reciprocating member, the first said nut having a collapsible thread to permit of continued turning of the rod after the valve has been moved to its closing position, substantially as described.

2. The combination with a valve seat and a gate valve movable edgewise across the seat to open and closing positions and also flatwise toward and from the seat, of a reciprocating member, means for forcing the valve against the seat when in closing position by the movement of said reciprocating member relatively to the valve, a screw threaded operating rod for reciprocating the valve and the reciprocating member, and means for preventing relative movement between the valve and said reciprocating member during the opening and closing movements of the valve and for permitting such relative movement when the valve is in closing position, such means comprising a collapsible screw thread between the valve and the operating rod, substantially as described.

3. The combination with a valve seat and a gate valve movable edgewise across the seat to open and closing positions and flatwise toward and from the seat, of a reciprocating member, means for forcing the valve against the seat when in closing position by the movement of said reciprocating member relatively to the valve, a screw threaded operating rod for reciprocating the valve and reciprocating member, and means for preventing relative movement between the valve and said reciprocating member during the opening and closing movements of the valve and for permitting such relative movements when the valve is in its closing position, such means comprising a collapsible screw thread between the valve and the operating rod, said collapsible screw thread being mounted between retaining shoulders by which it is prevented from moving longitudinally when expanded by the co-acting thread, substantially as described.

4. As a new article of manufacture, a screw nut having a collapsible thread mounted between shoulders for preventing longitudinal movement of the thread within the shell or casing when expanded by a threaded member screwed therein, substantially as described.

5. As a new article of manufacture, a screw threaded device having a collapsible thread and retaining shoulders for preventing longitudinal movement of the thread when expanded by a co-acting threaded member, substantially as described.

6. The combination with a screw threaded shaft, of two members each having a threaded part for engaging the shaft, the threaded part of one of said members having a collapsible thread for permitting a relative movement between said members when the shaft has been screwed part way out of such threaded part, substantially as described.

7. The combination with a screw threaded shaft, of two members each having a screw threaded part for engaging said shaft, one of the threads which form the connection between the shaft and one of said members being collapsible, whereby when the members have been moved together by the rotation of the shaft to a certain position the member connected to the shaft by means of the collapsible screw thread will remain at rest while the other of said members is moved by further rotation of the shaft, substantially as described.

8. The combination of a reciprocating member, a screw threaded shaft coöperating with a threaded part of said member for reciprocating said member, and a second member having a screw threaded part having a collapsible thread for engaging the screw threaded shaft for causing the said second member to be reciprocated by the rotation of the shaft and for permitting said second member after having been moved to a certain position by the rotation of the shaft to remain stationary during further rotation of the shaft, substantially as described.

9. The combination of two members having co-acting screw threads for causing a relative movement between said members when one of said members is rotated, one of said members having a collapsible screw thread whereby when the members are in a certain relative position the rotary member may rotate without causing a relative longitudinal movement between the members and without the screw threads of the two members running out of engagement, substantially as described.

In testimony whereof, I have hereunto set my hand, in the presence of two subscribing witnesses.

ANTHONY P. SMITH.

Witnesses:
  A. L. KENT,
  J. A. GRAVES.